(12) United States Patent
Olson

(10) Patent No.: US 9,527,356 B2
(45) Date of Patent: Dec. 27, 2016

(54) LOCKING HITCH RING

(71) Applicant: POWER PIN INC., Fort Qu'Appelle, Saskatchewan (CA)

(72) Inventor: Brian R. Olson, Fort Qu'Appelle (CA)

(73) Assignee: POWER PIN INC., Saskatchewan (CA)

( * ) Notice: Subject to any disclaimer, the term of this patent is extended or adjusted under 35 U.S.C. 154(b) by 0 days.

(21) Appl. No.: 14/904,690

(22) PCT Filed: Mar. 5, 2014

(86) PCT No.: PCT/CA2014/000172
§ 371 (c)(1),
(2) Date: Jan. 12, 2016

(87) PCT Pub. No.: WO2015/017912
PCT Pub. Date: Feb. 12, 2015

(65) Prior Publication Data
US 2016/0144679 A1    May 26, 2016

(30) Foreign Application Priority Data

Aug. 8, 2013  (CA) ...................................... 2823001

(51) Int. Cl.
*B60D 1/60* (2006.01)
*B60D 1/04* (2006.01)

(52) U.S. Cl.
CPC .. *B60D 1/60* (2013.01); *B60D 1/04* (2013.01)

(58) Field of Classification Search
CPC .............. B60D 1/60; B60D 1/605; B60D 1/04
See application file for complete search history.

(56) References Cited

U.S. PATENT DOCUMENTS

| 6,467,317 | B1* | 10/2002 | Hillabush | ................ | B60D 1/60 |
| | | | | | 280/507 |
| 6,578,392 | B1 | 6/2003 | Bowman et al. | | |
| 6,598,432 | B1 | 7/2003 | Dwyer | | |
| 6,698,256 | B2 | 3/2004 | Witchey | | |
| 6,862,904 | B1* | 3/2005 | Hubbart | ................... | B60D 1/60 |
| | | | | | 280/507 |
| 8,152,194 | B1* | 4/2012 | Landgraf | ................. | B60D 1/60 |
| | | | | | 280/507 |
| 2003/0151228 | A1 | 8/2003 | Spooner | | |
| 2007/0108732 | A1 | 5/2007 | Silva, II | | |

* cited by examiner

*Primary Examiner* — Kevin Hurley
(74) *Attorney, Agent, or Firm* — King & Schickli, PLLC

(57) ABSTRACT

A locking hitch ring apparatus includes a hitch ring member adapted at a rear end thereof for attachment to a towed vehicle. A drawpin hole defined by the hitch ring member is oriented such that an axis of the drawpin hole is oriented vertically when the hitch ring member is attached to the towed vehicle. A lock plate is movably attached to the hitch ring member such that the lock plate is movable from a closed position, where the lock plate blocks the drawpin hole, to an open position, where the drawpin hole is open, and a lock mechanism is operative to lock the lock plate in the closed position.

22 Claims, 5 Drawing Sheets

LOCKING HITCH RING

This disclosure relates to the field of hitches for connecting a towing and towed vehicles, such as a truck and trailer, and in particular a lock for the hitch ring on a towed vehicle to prevent an unauthorized vehicle from connecting to the hitch ring.

BACKGROUND

Theft of trailers and like towed vehicles is a significant problem, and security devices are well known for blocking the drawpin hole in the hitch ring of a trailer to prevent theft of the trailer. For example U.S. Pat. No. 6,467,317 to Hillabush et al. discloses a lock device where upper and lower lock members sandwich the hitch ring and plug the drawpin hole. U.S. Pat. No. 6,862,904 to Hubbart, U.S. Pat. No. 6,598,432 to Dwyer, and U.S. Pat. No. 6,578,392 to Bowman et al. are further examples of similar devices which comprise upper and lower parts locked together with the hitch ring between them to prevent access to the drawpin hole.

SUMMARY OF THE INVENTION

The present disclosure provides a locking hitch ring apparatus that overcomes problems in the prior art. In the prior art the locking mechanism is separate from the hitch ring itself, and so must be stored somewhere, preferably where same can be conveniently located when required. Keying the locks on a fleet of trailers so that a single key can give access to each trailer is problematic, and can be costly.

The present disclosure provides a locking hitch ring apparatus comprising a hitch ring member adapted at a rear end thereof for attachment to a towed vehicle. A drawpin hole is defined by the hitch ring member and is oriented such that an axis of the drawpin hole is oriented substantially vertically when the hitch ring member is attached to the towed vehicle. A lock plate is movably attached to the hitch ring member such that the lock plate is movable from a closed position, where the lock plate blocks the drawpin hole, to an open position, where the drawpin hole is open, and a lock mechanism is operative to lock the lock plate in the closed position.

The disclosure thus provides an assembly with integral locking parts operative to be placed in closed or open position to selectively block the drawpin hole to prevent theft, or open the drawpin hole to allow authorized users to connect a towing vehicle. The use of a padlock as part of the locking mechanism allows the use of economical padlocks that can be keyed the same to allow a single key to open all locking hitch rings in a fleet of trailers or the like. There is no need to store any part of the apparatus separately, where it may be lost and not available for use when next required.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
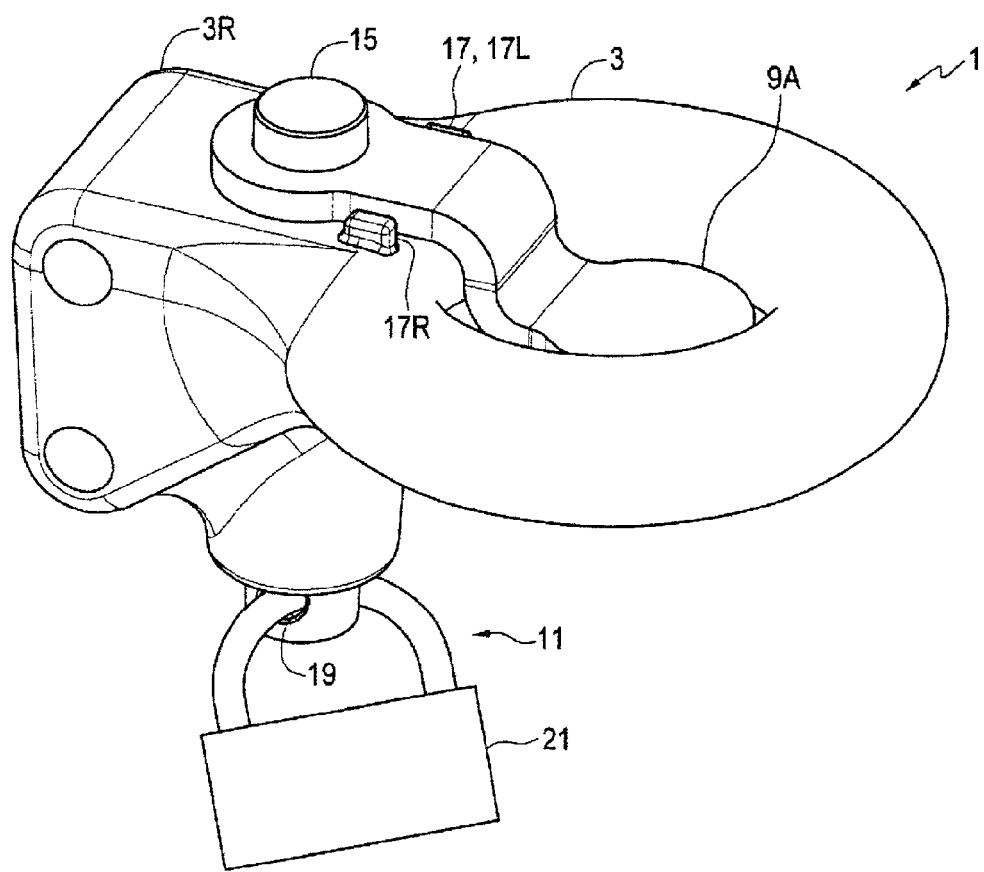
FIG. 1 is a perspective view of an embodiment of a locking hitch ring apparatus of the present disclosure, shown in the closed position with the drawpin hole blocked to prevent unauthorized access to the drawpin hole.
Figure 2:
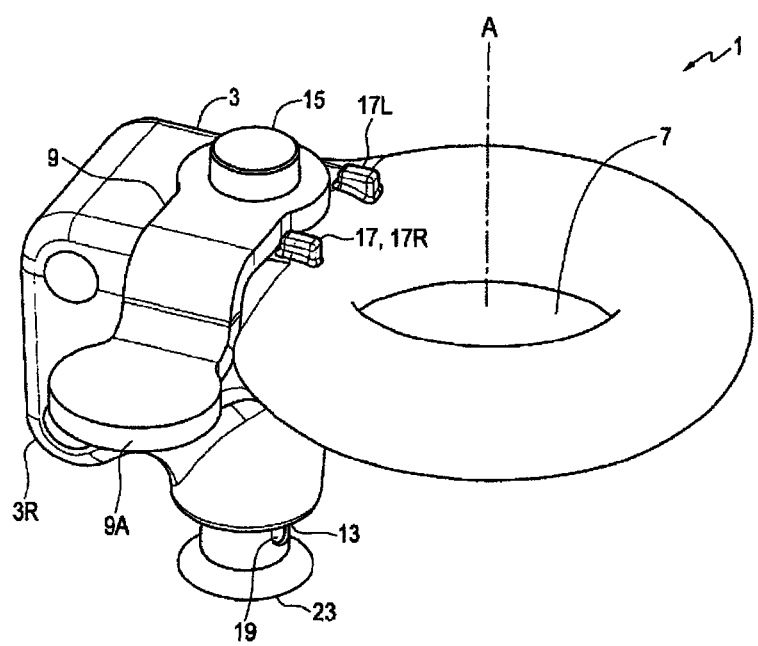
FIG. 2 is a perspective view of the embodiment of FIG. 1 shown in the open position with the drawpin hole open to allow authorized access to the drawpin hole.
Figure 3:
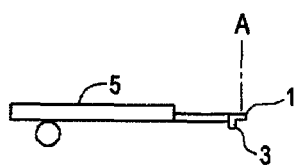
FIG. 3 is a schematic side view of the embodiment of FIG. 1 attached to a towed vehicle.

FIGS. 1-3 schematically illustrate an embodiment of a locking hitch ring apparatus 1 of the present disclosure. The apparatus comprises a hitch ring member 3 adapted at a rear end 3R thereof for attachment to a towed vehicle 5 by bolts through the illustrated holes. A drawpin hole 7 is defined by the hitch ring member 3 and is oriented such that an axis A of the drawpin hole 7 is oriented substantially vertically when the hitch ring member 3 is attached to the towed vehicle 5, and so is ready to receive a pintle hook or drawpin for connection to a towing vehicle.

A lock plate 9 is movably attached to the hitch ring member 3 such that the lock plate 9 is movable, while attached to the hitch ring member 3, from a closed position, as illustrated in FIG. 1 where the lock plate 9 blocks the drawpin hole 7, to an open position as illustrated in FIG. 2 where the drawpin hole 7 is open and the lock plate 9 is stored. A lock mechanism 11 is operative to lock the lock plate 9 in the closed position.

In the illustrated apparatus 1, the hitch ring member 3 defines a shaft hole 13, and a shaft 15 is rotatably and slidingly engaged in the shaft hole 13. The lock plate 9 extends from an upper end of the shaft 15 above the top surface of the hitch ring member 3 to the outer end 9A thereof.

In the illustrated apparatus 1, when in in the closed position the lock plate 9 extends from the shaft 15 along the top surface of the hitch ring member 3 and then down to the outer end 9A thereof which is inside the drawpin hole 7 between upper and lower edges of the drawpin hole 7. The lock mechanism 11 prevents upward movement of the shaft 15, and so lateral movement of the outer end 9A of the lock plate 9, which is located inside the drawpin hole 7, is prevented and the drawpin hole 7 is blocked.

In the illustrated apparatus 1, right and left lock lugs 17R, 17L extend upward from the top surface of the hitch ring member 3. The lock lugs 17 are oriented such that the lock plate 9 is between the right and left lock lugs 17R, 17L when in the closed position of FIG. 1, such that the right and left lock lugs 17R, 17L prevent lateral movement of the lock plate 9 away from the drawpin hole 7. Thus in the apparatus 1 both the lock lugs 17 and the fact that the outer end 9A of the lock plate 9 is inside the drawpin hole 7 between upper and lower edges of the drawpin hole 7 prevent lateral movement of the lock plate out of the closed position.

It is contemplated the lock plate could also extend only above the drawpin hole 7 as in the apparatus 101 described below, and not down into the drawpin hole 7, and the lock lugs 17 alone then prevent lateral movement, however bending the lock plate 9 down into the drawpin hole 7 adds security.

The illustrated lock mechanism 11 comprises a pin hole 19 extending through the shaft 15 adjacent to the bottom surface of the hitch ring member 3 when the lock plate 9 is in closed position, and a lock pin, conveniently provided for example by the illustrated padlock 21, extending through the pin hole 19 and preventing upward movement of the shaft 15. Padlocks are widely available and can be economically purchased and all keyed the same so that a single key could open the lock mechanisms on an entire fleet of trailers.

With the padlock 21 removed, the shaft 15 can move upward in the shaft hole 13 to raise the lock plate above the upper end of the lock lugs 17 and above the upper edge of the drawpin hole 7, so that the shaft 15 can be rotated to move the lock plate 9 laterally over the lock lug 17 to the open position illustrated in FIG. 2. The shaft 15 is rotated until the outer end 9A of the lock plate 9 is clear of the side of the hitch ring member 3, and then moved downward to move the lock plate 9 to the open position where the lock plate 9 is located beside the lock lug 17 and the outer end 9A of the lock plate 9 is located beside the hitch ring member 3 and below the top surface of the hitch ring member 3. The padlock 21 can then be replaced in the pin hole 19 to lock the lock plate 9 in the open position, and prevent the shaft 15 and attached lock plate 9 from being removed and lost. To ensure the shaft 15 and lock plate 9 are not removed if the padlock 21 is neglected, a head 23, as schematically illustrated in FIG. 2, can be added to the bottom end of the shaft 15 to prevent removal of the shaft 15 from the shaft hole 13.

Figure 4:
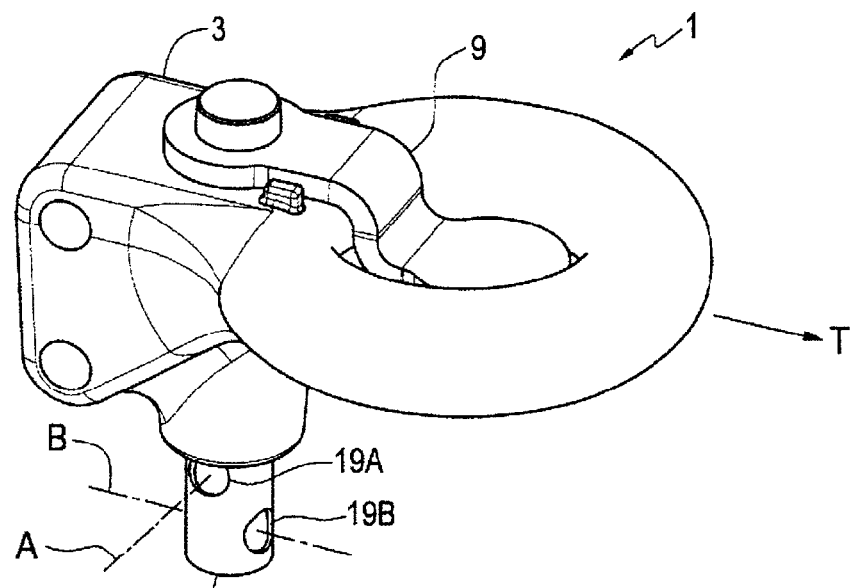
FIG. 4 is a perspective view of the embodiment of FIG. 1 with an extended shaft defining first and second pin holes, and showing the lock plate in the closed position.
Figure 5:
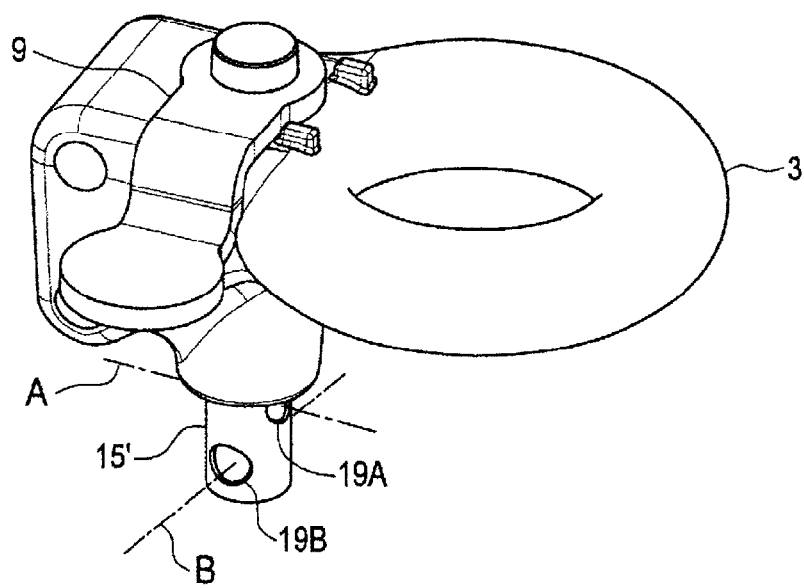
FIG. 5 is a perspective view of the embodiment of FIG. 1 with the extended shaft of FIG. 4 and showing the lock plate in the open stored position.
Figure 6:
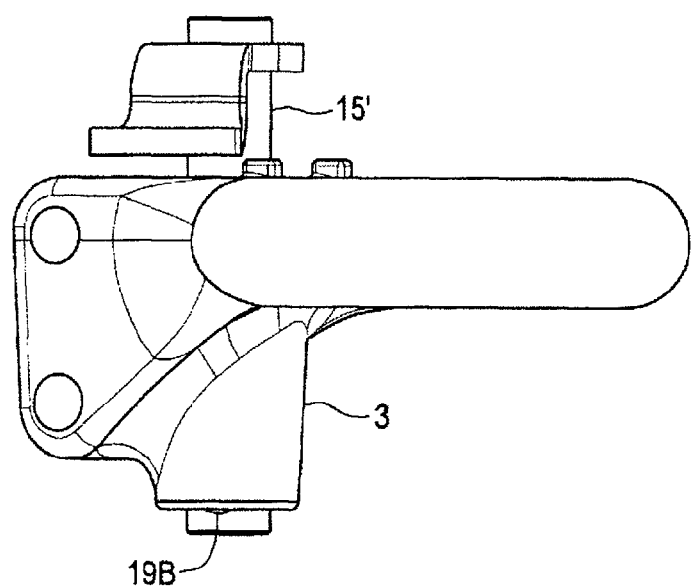
FIG. 6 is a side view of the embodiment of FIG. 1 with the extended shaft of FIG. 4, showing the shaft raised sufficiently to move the lock plate between the open and closed positions.

It is contemplated that in some applications, the padlock 21 may be readily inserted in the pin hole 19 when oriented in one direction, but when the lock plate is turned about 90 degrees between the open and closed positions, it is more difficult to insert the padlock. FIGS. 4-6 schematically illustrate the locking hitch ring apparatus 1 with an extended shaft 15' with a first pin hole 19A extending through the shaft 15' adjacent to the bottom surface of the hitch ring member 3 and a second pin hole 19B extending through the shaft 15. The axis A of the first pin hole 19A is above and substantially perpendicular to the axis B of the second pin hole 19B, and padlock can extend through either one of the first and second pin holes 19A, 19B.

The axis A of the first pin hole 19A is shown substantially perpendicular to the operating travel direction T of the towed vehicle when the lock plate 9 is in the closed position of FIG. 4. It is contemplated that in most applications it will be convenient to insert the padlock from side to side rather than from front to rear and in the illustrated apparatus with the extended shaft 15', the operator can insert the padlock from the side into the first pin hole 19A to secure the lock plate 9 in the closed position of FIG. 4, and then insert the padlock, again from the side, into the second pin hole 19B to secure the lock plate 9 in the open position of FIG. 5.

It can be seen in the side view of FIG. 6 that when the shaft 15' is raised sufficiently to move the lock plate between the open and closed positions, the bottom pin hole 19B is above the bottom surface of the hitch ring member 3, such that when the padlock extends through either the second pin hole 19B, or the first pin hole 19A which is above the second pin hole 19B, upward movement of the shaft 15 is limited such that the lock plate 9 cannot move between the open and closed positions.

Figure 7:
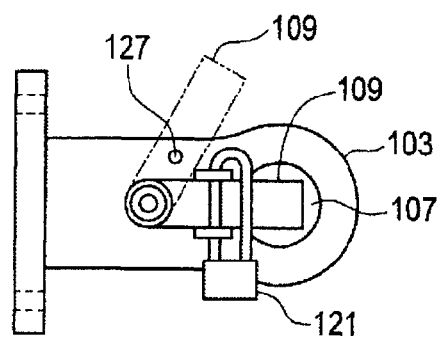
FIG. 7 is a schematic top view of an alternate embodiment of a locking hitch ring apparatus of the present disclosure, shown in the closed position, and with the open position shown in phantom lines.
Figure 8:
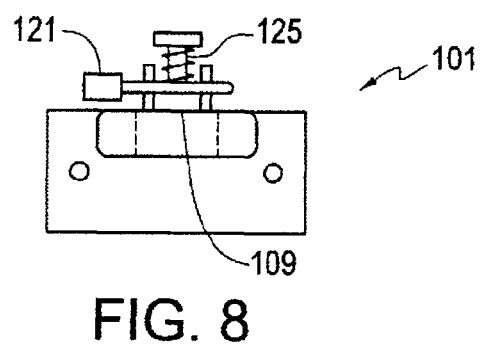
FIG. 8 is a schematic front view of the embodiment of FIG. 7.
Figure 9:
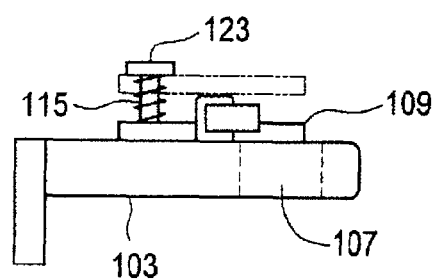
FIG. 9 is a schematic side view of the embodiment of FIG. 7.

FIGS. 7-9 schematically illustrates an alternative locking hitch ring apparatus 101 comprising a plate shaft 115 extending upward from a top surface of the hitch ring member 103 and wherein the plate shaft 115 extends through a plate shaft hole 113 in the lock plate 109 such that the lock plate 109 pivots laterally on the plate shaft 115.

Right and left lock lugs 117R, 117L are configured such that, when the lock plate 109 is in the closed position of FIGS. 7-9, the right and left lock lugs 117R, 117L extend upward from the top surface of the hitch ring member 103 in proximity to corresponding right and left edges of the lock plate 109. Each lock lug 117 defines a lug pin hole 119 and a lug pin, again illustrated as padlock 121, extends through the lug pin holes 119 above the top surface of the lock plate 109 when the lock plate 109 is in the illustrated closed position thereby preventing the lock plate from being removed from the closed position between the lock lugs 117. A head 123 on the top end of the plate shaft keeps the lock plate 109 from being removed.

A coil spring 125 is shown urging the lock plate 109 downward on the plate shaft 115. The lock plate 109 is moved to the open position, schematically illustrated in phantom lines in FIG. 7, by removing the padlock 121 and moving the lock plate 109 up and over the top of the lock lug 117, as schematically illustrated in FIG. 96, on one side or the other, and then laterally until the lock plate 109 clears the lock lug 117 and then moves downward beside the lock lug 117, where the bias force from the coil spring 125 keeps the lock plate in the open position. The padlock 121 can be placed through corresponding holes 127 in the lock plate 109 and hitch ring member 103 if desired to secure the lock plate in the open position and store the padlock 121.

Thus the disclosure, as shown in apparatuses 1 and 101, provides a locking hitch ring apparatus where the parts are integrated and always present and ready for use, rather than as in the typical prior art hitch ring locks where the parts of the lock mechanism are removed and must be stored somewhere until they are needed. Use of a padlock allows economical keying of the locking hitch rings of a plurality of trailers so that a single key can be used to access any trailer in a fleet.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:
1. A locking hitch ring apparatus comprising:
   a hitch ring member adapted at a rear end thereof for attachment to a towed vehicle;
   a drawpin hole defined by the hitch ring member and oriented such that an axis of the drawpin hole is oriented substantially vertically when the hitch ring member is attached to the towed vehicle;
   a lock plate movably attached to the hitch ring member such that the lock plate is movable while attached to the hitch ring member from a closed position, where the lock plate blocks the drawpin hole, to an open position, where the drawpin hole is open and the lock plate is stored; and a lock mechanism operative to lock the lock plate in the closed position.

2. The apparatus of claim 1 wherein the lock mechanism is operative to lock the lock plate in the open position.

3. The apparatus of claim 1 wherein the hitch ring member defines a shaft hole, and comprising a shaft rotatably and slidingly engaged in the shaft hole, and wherein the lock plate is attached to the shaft.

4. The apparatus of claim 3 wherein, when the lock plate is in the closed position, an outer end of the lock plate is inside the drawpin hole between upper and lower edges of the drawpin hole.

5. The apparatus of claim 4 wherein the lock plate extends from an upper end of the shaft above a top surface of the hitch ring member to the outer end thereof inside the drawpin hole.

6. The apparatus of claim 5 wherein the shaft moves upward in the shaft hole to raise the outer end of the lock plate above the upper edge of the drawpin hole, and the shaft is rotated to move the lock plate laterally to the open position.

7. The apparatus of claim 6 wherein the shaft is rotated and then moved downward to move the lock plate laterally to the open position where the outer end of the lock plate is located beside the hitch ring member and below the top surface of the hitch ring member.

8. The apparatus of claim 3 wherein, when the lock plate is in the closed position, an outer end of the lock plate is above the drawpin hole.

9. The apparatus of claim 8 wherein the lock plate extends from an upper end of the shaft above a top surface of the hitch ring member to the outer end thereof above the drawpin hole.

10. The apparatus of claim 9 comprising right and left lock lugs extending upward from the top surface of the hitch ring member, the lock lugs oriented such that the lock plate is between the right and left lock lugs when in the closed position, such that the right and left lock lugs prevent lateral movement of the lock plate away from the drawpin hole, and wherein the lock mechanism prevents upward movement of the shaft.

11. The apparatus of claim 10 wherein the shaft moves upward in the shaft hole to raise the lock plate above an upper end of at least one lock lug, and the shaft is rotated to move the lock plate laterally over the at least one lock lug to the open position.

12. The apparatus of claim 11 wherein the shaft is rotated and then moved downward to move the lock plate laterally to the open position where the lock plate is located beside the at least one lock lug.

13. The apparatus of claim 12 wherein the lock mechanism comprises a pin hole extending through the shaft adjacent to a bottom surface of the hitch ring member when the lock plate is in the open and closed positions, and a lock pin extending through the pin hole and preventing upward movement of the shaft.

14. The apparatus of claim 13 wherein the lock mechanism comprises a first pin hole extending through the shaft adjacent to a bottom surface of the hitch ring member and a second pin hole extending through the shaft, and wherein an axis of the first pin hole is above and substantially perpendicular to an axis of the second pin hole, and wherein the lock pin extends through one of the first and second pin holes.

15. The apparatus of claim 14 wherein the axis of the first pin hole is substantially perpendicular to an operating travel direction of the towed vehicle when the lock plate is in the closed position.

16. The apparatus of claim 14 wherein when the lock pin extends through the second pin hole, upward movement of the shaft is limited such that the lock plate cannot move between the open and closed positions.

17. The apparatus of claim 13 wherein the lock pin is provided by a padlock.

18. The apparatus of claim 1 comprising a plate shaft extending upward from a top surface of the hitch ring member and wherein the plate shaft extends through a plate shaft hole in the lock plate such that the lock plate pivots laterally on the plate shaft.

19. The apparatus of claim 18 comprising right and left lock lugs configured such that, when the lock plate is in the closed position, the right and left lock lugs extend upward from the top surface of the hitch ring member in proximity to corresponding right and left edges of the lock plate.

20. The apparatus of claim 19 wherein each lock lug defines a lug pin hole and comprising a lock pin extending through the lug pin holes above a top surface of the lock plate when the lock plate is in the closed position.

21. The apparatus of claim 20 wherein the lock pin is provided by a padlock.

22. A trailer comprising the locking hitch ring apparatus of claim 1 attached to a front end thereof.

* * * * *